United States Patent [19]

Counter

[11] 3,837,340
[45] Sept. 24, 1974

[54] DEVICE FOR ADMINISTERING IMMUNICATION AGAINST VIRUS

[75] Inventor: Frederick T. Counter, Greenfield, Ind.

[73] Assignee: Eli Lilly and Company, Indianapolis, Ind.

[22] Filed: June 4, 1973

[21] Appl. No.: 367,089

Related U.S. Application Data

[63] Continuation-in-part of Ser. No. 190,869, Oct. 20, 1971, abandoned.

[52] U.S. Cl.................. 128/260, 128/253, 128/268, 424/28, 424/89
[51] Int. Cl...................... A61m 13/00, A61b 17/20
[58] Field of Search ....... 424/28, 89; 128/2 W, 260, 128/268, 253

[56] References Cited
UNITED STATES PATENTS

| | | | |
|---|---|---|---|
| 2,561,071 | 7/1951 | Prisk | 128/260 |
| 2,579,403 | 12/1951 | Slomowitz et al. | 128/268 |
| 3,026,874 | 3/1962 | Stevens | 128/260 |
| 3,452,135 | 6/1969 | Medveczky | 424/9 |
| 3,551,554 | 12/1970 | Herschler | 424/7 |
| 3,565,075 | 2/1971 | Jerry | 128/268 |

FOREIGN PATENTS OR APPLICATIONS

| | | | |
|---|---|---|---|
| 25,675 | 1909 | Great Britain | 424/89 |

OTHER PUBLICATIONS

Chemical Abstracts, Vol. 35, 1941, pp. 1118–1119, Ammunological Studies on the Function of Skin, Isikawa.

Chemical Abstracts, Vol. 69, 1968, p. 10,302, Article 109829c, Dispersions for Percutaneous Application, Medneczky.

Chemical Abstracts, Vol. 19, 1925, p. 119, Vaccination of the Rabbit Against Staphylococcus by Way of the Skin and by Way of Digestive Track, Achille Urbain.

Primary Examiner—Aldrich F. Medbery
Attorney, Agent, or Firm—Joseph A. Jones; Everet F. Smith

[57] ABSTRACT

Live avirulent virus used to immunize against smallpox, measles, or mumps, or a combination of them, is applied as a dry deposit on a physiologically inert surface of a device adapted to be held against the unbroken skin of an animal to be immunized. Illustratively, cowpox virus as a dry surface deposit is applied at the midpoint of a plastic bandage; it is used by applying the bandage for a period of time to a body site at which the immunization is to be applied.

9 Claims, 8 Drawing Figures

PATENTED SEP 24 1974 3,837,340

INVENTOR.
FREDERICK T. COUNTER
BY Thomas J. Page

DEVICE FOR ADMINISTERING IMMUNICATION AGAINST VIRUS

CROSS REFERENCE

This application is a continuation-in-part of my co-pending application Ser. No. 190,869, which was filed Oct. 20, 1971 and is now abandoned.

BACKGROUND OF THE INVENTION

1. Field of the Invention

This invention concerns the administration of a live avirulent virus, frequently an attenuated live virus, to an animal in which the administered virus evokes an immune reaction, leaving the animal immune to natural attack by the virus. Such immunizing virus has hitherto been administered by injection or by application to a scarified surface.

2. The Prior Art

U.S. Pat. No. 1,212,927 shows a vaccinating device. The device appears to be a mechanical instrument to be attached to an arm, comprising a scarifer and an applicator for liquid vaccine.

U.S. Pat. No. 2,235,436 appears to teach a pressure-sensitive bandage device especially useful in testing for allergic reactions. Diverse allergens are confined in receptacles in a bandage structure so arranged that the different allergens have different localities at which to exhibit their reactions, yet are all applied in the same bandage.

U.S. Pat. No. 2,489,675 provides for a bandage with a container for an ointment or medicament built integrally into the bandage structure.

U.S. Pat. No. 2,522,309 is corcerned with an allergy testing instrument, and in particular represents a way of combining the operations of scarification and application of the allergen.

U.S. Pat. No. 2,575,648 is concerned with an applicator to be used in the application of a vaccine or the like to a domestic animal.

U.S. Pat. No. 2,619,962 patented Dec. 2, 1962, for a "vaccination appliance" appears to pertain to a metal patch bearing a plurality of sharp points, intended to be used to scarify a vaccination site after that site has first been sterilized and then had a liquid vaccine applied to it.

U.S. Reissue Pat. No. 25,637 discloses a device presenting a bandage-like support comprising backing, adhesive, and dried vaccine, comprising also a scarifier presenting sharp teeth that are intended to perforate the skin. This device is unsatisfactory because it continues to induce scarification wounds long after the need for scarification is past, and even with good management, such wounds tend to become infected.

U.S. Pat. No. 3,598,122 discloses a bandage comprising a backing layer, a reservoir to hold a systemically active drug, and a cover layer, the entire article being held in skin contact by a pressure-sensitive adhesive layer.

U.S. Pat. No. 3,598,123 discloses a bandage bearing, on a skin approaching surface, a plurality of microcapsules which contain a drug.

Virus vaccines, usually as aqueous liquid preparations, but to some extent also as dry solids, are articles of commerce.

SUMMARY

The present invention is a device for use in immunizing an animal which sweats through its skin against smallpox, mumps, or measles, which comprises a deposit of an immunizing amount of a dry, avirulent, live, immunizing virus on a benign, virus-compatible surface adapted to hold such virus deposit in contact with the unbroken skin of the animal to be immunized, said virus being a virus for immunizing against one or more of smallpox, mumps, and measles.

DESCRIPTION OF THE PREFERRED EMBODIMENT

Figure 1:
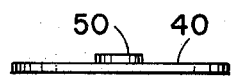

This invention arises from the discovery that live avirulent viruses, used for immunization against recognized virus diseases, readily gain entry to the system when they are held in intimate contact with unbroken, unabraded, unscarified skin of an animal that sweats through its skin. Illustratively, dogs, cattle, and rabbits do not sweat through their skins, whereas horses, humans and various other animals do.

The belief has long been held that a live virus could not gain useful entry to a body through unbroken skin, the outer layer of which has been thought of as a very thin, horn-like layer, essentially impermeable to molecules as large as those of a virus. The success of the invention refutes the art's belief.

The present inventor does not know the mechanism by which his invention immunizes animals, but does call attention to the fact that the unbroken skin is not a continuous surface. Rather, hair follicles, sebaceous glands, sweat glands and the like provide natural openings into the interior of the body. Future research may ascertain that the precise entry portal is found in some particular detail of skin structure.

It is recognized that the first entry by a virus molecule into a living cell in which the virus becomes well established and begins to replicate actively is all that is needed to initiate the immunizing reaction, and for the immunization process to be successful. Typically, a two-hundred-fold increase, approximately, in virus abundance takes place in less than a day, for each such succesful virus invasion of a living cell. The normal virus multiplicatiopn process promptly makes up any possible deficiency in abundance of originally applied vaccination material.

In light of this discovery, the device is used to deliver a suitable dry, immunizing, avirulent live virus in immunizing manner by providing intimate and substantially continuous contact between the dry virus on the device and the skin of an animal that sweats through its skin, for a period of time long enough that the virus gains entry and initiates the immune reaction process, and thereafter such contact is discontinued.

The virus used in the immunizing devices is one or more of the viruses which immunize against smallpox, mumps, and measles. No novel immunizing viruses are disclosed here. The live viruses conventionally used in percutaneous vaccination are effective in the new devices. More than one such virus may be combined in a single device.

As is well known in the art, viruses used for immunization must be avirulent. Various methods are used in the art to assure that immunizing viruses are avirulent. In conventional immunization, killed or inactivated viruses are often used, but such viruses are not effective in the new devices. The viruses used for immunizing against mumps and measles are live, attenuated strains of the viruses which cause mumps and measles. Such strains have been isolated from animals with the diseases, and attenuated by treatment with toxic chemicals or other environmental factors until the virus has been weakened. The attenuation of an immunizing virus is stopped when the virus is still antigenic, but has been so weakened that it is avirulent.

The virus used to immunize against smallpox is the natural cowpox virus. Surprisingly, the cowpox virus has the ability to immunize against smallpox, but does not cause smallpox. The virus is avirulent; it causes only a harmless, localized infection in the vaccinated animal.

It is well known in the vaccination art that, for the convenience of the patient and of the physician, more live viruses than one can be applied at a time. Subject to the judgment of the physician or veterinarian as to the age, condition, and other aspects of the subject to be immunized, more viruses than one, of those here indicated, can be applied at one time by the device of this invention. When such simultaneous multiple immunizations are desired, all the viruses, each in the amount representing about one standard dose if used in liquid form, can be applied to the carrying device, or bandage, and they can be dried together. Also, if desired, they can be mixed in aqueous form and dried, or they can be dried from aqueous form separately and applied as a mixture of the resulting solids, in powder form.

Equally, the aqueous virus suspension can be contacted with a bibulous, water-insoluble polymer such as a lightly cross-linked polyacrylamide to yield a virus-bearing gel which can then be partially dried to yield a sliceable solid or completely dried to yield a grindable solid. A thin slice or a fine dust of ground powder can be the vehicle in which the virus is brought to the surface of the support means used to hold the virus in contact with the skin.

To facilitate holding the immunizing virus in a single spot long enough for the virus to gain entry, the virus is deposited on a physiologically inert and preferably moisture impermeable surface that can be held against the skin for the necessary time. Conveniently, this physiologically inert surface is a surface of a small object. Illustratively, it can be a small disc, rectangle, oval, or other shape of an inert polymer such as glass, a phenol-formaldehyde resin, polystyrene, cellulose film, polyvinyl chloride, epoxy resin, or the like. Desirably the small object can be flexible and compliant, to facilitate making intimate and continuous skin contact. It can also be held in place by a pressure-sensitive adhesive, or by a fabric overwrap in the character of a bandage, or in other ways. The art of manufacturing small, compliant, flexible, prefabricated bandages to be affixed by pressure-sensitive adhesive provides many completely satisfactory carriers to be used in this invention.

The virus suspension can also be applied to the surface of a gauze pad or the like, provided that sufficient live virus remains at the skin-contacting surface to effect surface contact with no obstruction to the virus between support and skin.

In order to enjoy the advantages and benefits of this invention it is essential that the virus-bearing surface be free of features that would, if present, tend to cut, lacerate, scarify, abrade, or otherwise break the intact surface of the skin at the time of application. A surface free of such injurious features is called, for purposes of the present specification and claims, a benign surface.

The art preparation of an immunizing virus usually calls for the virus to be taken up in aqueous saline, to which glycerine or other humectant substance may be added. To facilitate the presentation of the dry virus according to this invention, such humectants are preferably omitted, leaving an essentially aqueous saline suspension of the virus.

In one convenient manner of making the device of the present invention, the aqueous virus is applied as a small drop at or near the midpoint of a plastic surface of a small bandage-like structure, and there promptly air-dried. Alternatively, the virus can be dried in laboratory or production equipment, such as a lyophilizing apparatus, reduced to a powder, and the powder applied to an adhesive spot on the supporting article. However formed, the dry virus can be modified by addition to it of a bulking agent such as lactose, glucose, a protein hydrolysate, a natural gum such as guar or a synthetic gum such as methyl cellulose.

The bulking agent can be combined with the aqueous virus and applied as the virus is applied; or may be applied first, awaiting the application of the virus. The bulking agent can be omitted; in some uses it is convenient, but unnecessary.

The amount of virus to be applied can vary. Effective amounts will range from about $10^4$ to about $10^8$ $EID_{50}$ per deposit. For comparison, current immunization practice ordinarily makes use of a virus presenting about $10^7$ $EID_{50}$ per 0.1 ml., and 0.02 ml. is the standard amount applied in an immunization. Thus, in the prior art immunization practice, on the order of $2 \times 10^6$ $EID_{50}$ is administered, which is usually regarded as a substantial excess. Dosages of the same order of magnitude, more or less, are effective amounts according to the present invention.

Virus preparations are quantified as to strength by the $EID_{50}$ unit, the unit being that amount of the preparation which, when introduced into each egg of a statistically significant group of embryonated hen's eggs, evokes an infective response in fifty percent of the eggs. The expression "EID" abbreviates the expression, "egg infective does." Insofar as the present inventor knows, no measurement of an actual quantity of live virus has ever been made.

This invention offers the great advantage over the prior art that the vaccine in dry form is much more stable to aging than it is in aqueous suspension. Vaccine in dry form is an article of commerce, and the dry virus is recognized in the art to have a storage stability such that it retains its potency about six times as long as does the aqueous suspension. The recall date on dry virus is typically 18 month as contrasted with 90 days for the aqueous suspension. That benefit inures here. Routinely in the prior art, 20 or more doses of dry virus are reconstituted at one time by the addition of sterile water. This not only imposes upon the physician or veterinarian the inconvenience of sterile laboratory techniques and the necessity to provide sterile water free of objectionable material, it also furnishes a plurality of doses at one time. It has not been convenient, and it is not commonly practiced, to reconstitute a single dose at a time. Any vaccine thus reconstituted begins to age at once and is routinely discarded if not used within 90 days.

The duration of skin contact necessary for the dry virus on a device of this invention to gain entry and be effective will vary with the patient's species, age, physical condition, condition of skin, activity level, perspiration rate, and other factors. Effective contact time can be as short as 10 minutes or as long as a day. 8 hour contact durations have given good results.

For cosmetic reasons it is routine to keep the application site of an immunizing virus as small as is compatible with efficacy. The deposit of dry vaccine is therefore preferably as small as is compatible with efficacy, of the general order of 1-5 millimeters in greatest dimension. The spread of reinfective exudate from a resulting pustule should also preferably be minimized. The latter is preferably accomplished by providing an air space or absorbent material around the perimeter of the surface holding the dry vaccine deposit, rather than a continuous compliant nonabsorbent surface. Also, the reinfective exudate develops only after the virus has become fully active and abundant; timely removal of the present device, permitting the site to air dry, is preferred.

Figure 2:
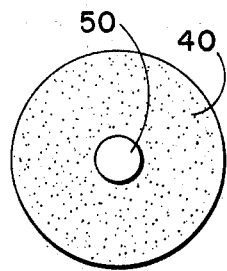
Figure 3:
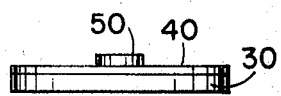
Figure 4:
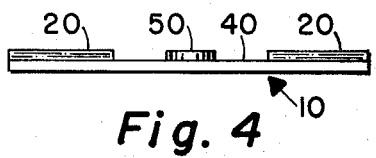

In the drawing, in which no dimension, actual or relative to other parts of the drawing, is to be regarded as necessarily significant, FIG. 1 shows the deposit 50 of vaccine on support 40, in section, while FIG. 2 shows the same in plan. FIG. 3 shows the embodiment of FIGS. 1 and 2 modified by the addition of a compressible cushion member 30, which is desired to enhance compliant skin contact with deposit 50. FIG. 4 shows support 40 carrying vaccine deposit 50, being provided with pressure-sensitive adhesive means 20, whereby the support 40 and adhesive 20 constitute bandage means 10.

Figure 5:
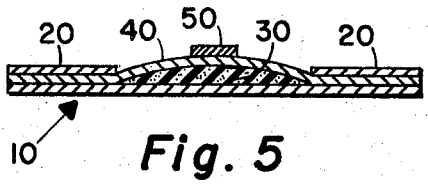

In FIG. 5, support 40 is backed with compression means (or cushion) 30 as an entrapped air bubble. When bandage means 10 is held by pressure-sensitive adhesive 20, bubble 30 urges deposit 50 into good contact with the skin of the patient to be immunized.

Figure 6:
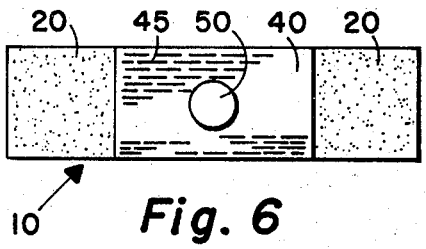

In FIG 6, small prefabricated bandage 10 with adhesive 20, carrier surface 40 with perforations 45 bears on its skin-approaching surface deposit 50 of the virus.

Figure 7:
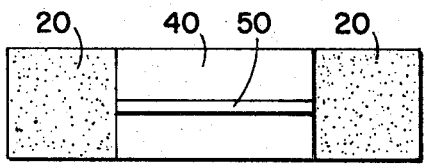

FIG. 7 is similar to FIG. 6 except that perforations are omitted, and virus 50 is a line, applied by a rolling printer wheel or quill.

Figure 8:
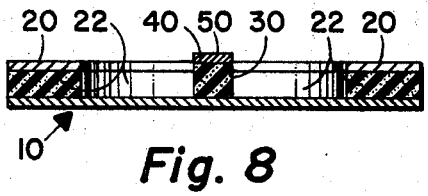

In FIG. 8, virus deposit 50 is supported on support 40 here produced as a pinnacle arising from bandage means 10, circumferentially surrounded by cushion means 22 bearing adhesive 20. In this form, spread of reinfective vesicular exudate is minimized.

In the preferred embodiments of this invention, the surface of carrier means 40 is inherently impermeable to moisture, in the sense that it acts as a barrier to the ready passage of moisture. In the case of the perforated form, the surface between perforations is more preferably impermeable.

EXAMPLE 1

In a representative practice of this invention, a device according to this invention was prepared. A pooled cowpox vaccine, partially finished for medical use in conventional vaccination, provided the virus. The aqueous saline cowpox vaccine differed from the standard vaccine only in the absence of humectant. In virus titer the vaccine was similar to other commercial vaccines.

A small, commercial, pressure-sensitive bandage provided the carrier means for the virus. The skin-approaching actual bandage surface, but not the adhesive area, was covered with a small area of commercial, household-type sheet plastic believed to have been 0.5 mil polyolefin sheet. At approximately the midpoint of the skin-approaching surface of the plastic-covered bandage, a 0.02 ml. drop of the vaccine was applied, and permitted to air dry.

The bandage with dry virus deposit was applied high on the outer aspect of the upper arm of a young adult Caucasian male volunteer at a spot free from evident surface features and in particular free from other vaccination scars, and application was made with the dry virus deposit urged against the skin of the volunteer. Thereafter, the device was left undisturbed for about 8 hours while the volunteer carried on otherwise normal activities.

At the end of about 8 hours, the device was removed. No other treatment of any sort was employed, and the site was observed. 24 hours after application of the device, typical pustule formation had begun and at the end of 48 hours, a completely conventional active vaccination site, commonly called a "take," was evident. The course of the entire vaccination procedure, except for the means of application of the virus, was completely routine.

EXAMPLE 2

The following test was conducted to evaluate the performance of the new immunizing devices in vaccinating guinea pigs against mumps. Immunizing devices were made by making a 2 cm. square of folded cotton gauze, and adhering the gauze in the center of a larger square of adhesive tape. The gauze was covered with a layer of cellulose dialysis membrane, leaving sufficient adhesive tape bare of membrane to hold the device on the guinea pig. A drop of about 0.025 ml. of a commercial mumps vaccine was placed in the center of the membrane, atop the square of cotton gauze, and the vaccine was dried at room temperature.

Immunizing devices were affixed to the shaved flank of each of ten guinea pigs; two untreated guinea pigs were held as controls. The devices were left on the pigs for 24 hours.

After a three-week period, during which time four of the guinea pigs died for reasons unrelated to the experiment, serum samples were prepared from blood drawn from each guinea pig. The conventional mumps hemagglutination test was then performed in the following manner. Each serum sample was serially diluted with phosphate-buffered physiological saline to dilutions from 1:4 to 1:128. Four hemagglutination units of mumps virus were added to each diluted serum sample, and the samples were shaken. Red blood cells were then added to each diluted serum sample, and the samples were allowed to stand for two hours at room temperature. The diluted samples were then shaken again, stored at 4°C. overnight, and the extent of hemagglutination was read in the morning.

The extent of hemagglutination observed in each diluted sample is reported below as a rating. A dash indicates no hemagglutination, 4 indicates complete hemagglutination, and 1, 2, or 3 indicates successively more complete hemagglutination. The lack of hemagglutination in a diluted sample indicates that the antibodies in the serum have neutralized the hemagglutination capability of the added virus. Therefore, the more highly the serum can be diluted before hemagglutination develops, the more complete the immunization of the test animal.

| Guinea Pig No. | 1:4 | 1:8 | Dilution 1:16 | 1:32 | 1:64 | 1:128 |
|---|---|---|---|---|---|---|
| 2463 | — | — | 2 | 4 | 4 | 4 |
| 2464 | — | — | — | 2 | 4 | 4 |
| 2465 | — | — | 2 | 4 | 4 | 4 |
| 2466 | 1 | 4 | 4 | 4 | 4 | 4 |
| 2467 | — | 2 | 4 | 4 | 4 | 4 |
| 2468 Control | 2 | 3 | 4 | 4 | 4 | 4 |
| 2470 Control | 4 | 4 | 4 | 4 | 4 | 4 |
| 2472 | — | 2 | 4 | 4 | 4 | 4 |

The data show very effective immunization of the animals. The controls showed complete hemagglutination at a dilution as low as 1:4, and at 1:16 at the most. In contrast, two of the test animals showed complete hemagglutination only at 1:32 dilution, and the lowest dilution at which a test animal gave complete hemagglutination was one-eighth. Therefore, immunization with the devices gave at least two-fold and perhaps eight-fold increase in immunity against mumps.

EXAMPLE 3

The ability of the devices to immunize guinea pigs against mumps was evaluated in a second test. In general, the test was run as above. One group of five pigs was vaccinated as above with a standard mumps vaccine. A second group of five pigs was vaccinated in the same way with a trivalent vaccine containing mumps, measles, and rubella antigens.

When the pigs were bled, group pooled serum samples were prepared by mixing in equal volume of serum from each pig of each group. Hemagglutination tests were then performed on the pooled samples as described above, using mumps virus as the hemagglutination reagent.

| | 1:4 | 1:8 | 1:16 | Dilution 1:32 | 1:64 | 1:128 | 1:256 |
|---|---|---|---|---|---|---|---|
| Intact skin | | | | | | | |
| Group A | — | — | — | 2 | 3 | 4 | 4 |
| Group B* | — | — | — | 3 | 4 | 4 | 4 |
| Control | — | — | 2 | 4 | 4 | 4 | 4 |

* Trivalent vaccine

The data above show clearly that the guinea pigs were immunized by the device. Blood samples from the control animals were completely agglutinated at 1:32 dilution, and partially agglutinated at 1:16. In contrast, one group of vaccinated animals showed complete hemagglutination at 1:128 dilution of the blood samples, the other group of animals, at 1:64. Vaccination with the immunizing devices therefore accomplished a two- to four-fold increase in the pigs' immunity to mumps a significant change.

EXAMPLE 4

A human volunteer was immunized against measles with one of the new devices. An immunizing device carrying 0.025 ml., before drying, of commercial measles vaccine was made in the same way that the mumps immunizing devices above were made. The device was adhered to the volunteer's upper arm at a spot free from other vaccination scars, and left in place during a normal 8 hour working day. A blood sample was taken before the immunizing device was affixed, and post-vaccination blood samples were taken 14 and 42 days after the vaccination. Hemagglutination tests were run as described above on serum separated from the three blood samples, with the results below.

| | 1:4 | 1:8 | Dilution 1:16 | 1:32 |
|---|---|---|---|---|
| Pre-Vaccination Sample | 1 | 3 | 4 | 4 |
| 14-Day Sample | — | 1 | 3 | 4 |
| 42-Day Sample | — | 1 | 3 | 4 |

The results of the test above were also evaluated by the serum-neutralization test. AV-2 cell culturees were grown in medium 199 until confluent cell sheets had formed. Serial dilutions of the three serum samples, taken the day of and 14 and 42 days after vaccination, were made in medium 199. Portions of virulent measles virus each containing 50–500 $TCID_{50}$ of virus were added to the diluted serum samples, and the samples were allowed to stand for one hour at 4°C. Aliquots of each diluted sample were added to each of two duplicate cell cultures.

The cell cultures were then incubated at 36°C., and were observed at 6 and 15 days. Presence or absence of cytopathogenic effect (CPE) caused by virus was noted at each observation. Presence of CPE at an observation is shown below as +; absence as 0. The 15-day observations are in parentheses.

The lack of CPE in a culture indicates that the serum antibodies have neutralized the added virus. The more highly the virus can be diluted before CPE appears, therefore, the more complete the immunization.

|  | 1:4 | 1:8 | 1:16 | 1:32 | Dilution 1:64 | 1:128 | 1:256 | 1:512 |
|---|---|---|---|---|---|---|---|---|
| 0 Days, Culture 1 | 0(0) | 0(0) | 0(0) | +(+) | (+) | +(+) | +(+) | +(+) |
| 0 Days, Culture 2 | 0(0) | 0(0) | 0(0) | 0(+) | +(+) | +(+) | +(+) | +(+) |
| 14 Days, Culture 1 | 0(0) | 0(0) | 0(0) | +(+) | +(+) | +(+) | +(+) | +(+) |
| 14 Days, Culture 2 | 0(0) | 0(0) | 0(0) | 0(0) | +(+) | +(+) | +(+) | +(+) |
| 42 Days, Culture 1 | 0(0) | 0(0) | 0(0) | 0(0) | 0(0) | +(+) | +(+) | +(+) |
| 42 Days, Culture 2 | 0(0) | 0(0) | 0(0) | 0(0) | 0(0) | +(+) | +(+) | +(+) |

The controls for the measles test consisted of ten-fold dilutions of the measles virus used. Equal volumes, equal to the volume used in each diluted sample above, of the diluted virus were added to 10 cell cultures of AV-2 cells. The results below confirm that the dose of virus added to each culture contained approximately 50-500 $TCID_{50}$.

Two cultures from each serum pool were tested at each dilution.

|  | 1:4 | 1:8 | 1:16 | Dilution 1:32 | 1:64 | 1:128 |
|---|---|---|---|---|---|---|
| Group A, Culture 1 | 0 | 0 | + | + | + | + |
| Group A, Culture 2 | 0 | 0 | + | + | + | + |
| Group B, Culture 1 | 0 | 0 | + | + | + | + |
| Group B, Culture 2 | 0 | + | + | + | + | + |
| Control Pool, Culture 1 | 0 | + | + | + | + | + |
| Control Pool, Culture 2 | + | + | + | + | + | + |

| Dilution | Cultures Showing CPE |
|---|---|
| Undiluted | 10/10 |
| $10^{-1}$ | 10/10 |
| $10^{-2}$ | 5/10 |
| $10^{-3}$ | 0/10 |

The volunteer, of course, had some immunity against measles before the test began. Therefore, the increase in measles immunity was not as dramatic as it would have been in a nonimmune individual such as an infant. Nevertheless, the serum-neutralization data indicate a four-fold increase in measles antibody was accomplished by application of the new device.

EXAMPLE 5

Another guinea pig test was performed with devices carrying measles vaccine. The devices were made and applied as were the other devices here described. Two groups of 10 pigs each were used. One group (A) was vaccinated with devices carrying a commercial measles vaccine, and the other group (B) was vaccinated with devices carrying a trivalent measles, mumps, and rubella vaccine.

All the pigs were bled before the test began, and equal volumes of the blood samples were mixed to make a control pool. The pigs were bled again 19 days after the devices had been adhered to their shaved flanks for 24 hours. The samples from the 10 pigs of each group were pooled and tested by the serum-neutralization test which was explained above.

It is clear from the data above that the new immunizing devices immunized the guinea pigs against measles to the extent of a two- to four-fold increase in measles antibody.

I claim:

1. A device for use in immunizing an animal which sweats through its skin, against smallpox, mumps, or measles, which comprises a deposit of an immunizing amount of a dry, avirulent, live, immunizing virus on a bengin, virus-compatible surface supported on means for holding such virus deposit in contact with the unbroken skin of the animal to be immunized, said virus being a virus for immunizing against one or more of smallpox, mumps, and measles.

2. A device of claim 1 which the virus is present in the amount of from about $10^4$ to about $10^8$ $EID_{50}$ and is distributed on said surface.

3. A device of claim 1 in which the virus is a combination of viruses selected from the viruses for immunizing against smallpox, mumps, and measles.

4. A device of claim 1 in which the benign, virus-compatible surface is moisture-impermeable.

5. A device of claim 1 in which the perimeter of the benign, virus-compatible surface is isolated from nearby structure by an air space.

6. A device of claim 1 in which the perimeter of the benign, virus-compatible surface is surrounded by an absorbent material on said support.

7. A device of claim 1 in which the virus is for immunizing against smallpox.

8. A device of claim 1 in which the virus is for immunizing against mumps.

9. A device of claim 1 in which the virus is for immunizing against measles.

* * * * *

PO-1050
(5/69)

UNITED STATES PATENT OFFICE
CERTIFICATE OF CORRECTION

Patent No. 3,837,340          Dated September 24, 1974

Inventor(s) Frederick T. Counter

It is certified that error appears in the above-identified patent and that said Letters Patent are hereby corrected as shown below:

Column 7, line 27, "one-eighth" should read -- 1:8 --.

Column 8, line 38, "culturees" should read --cultures--.

Column 10, line 32, "on means" should read -- on a means --.

The word "IMMUNICATION" in the Title should read
  --IMMUNIZATION--.

Signed and sealed this 11th day of February 1975.

(SEAL)
Attest:

RUTH C. MASON
Attesting Officer

C. MARSHALL DANN
Commissioner of Patents
and Trademarks